United States Patent [19]

Stadler

[11] Patent Number: 5,190,142
[45] Date of Patent: Mar. 2, 1993

[54] LIFT AND CARRY ACCUMULATING CONVEYOR

[75] Inventor: Jeffery A. Stadler, Fenton, Mich.

[73] Assignee: Excel Corporation, Fenton, Mich.

[21] Appl. No.: 664,086

[22] Filed: Mar. 4, 1991

[51] Int. Cl.$^5$ .............................................. B65G 25/00
[52] U.S. Cl. .................................. 198/774.3; 198/778
[58] Field of Search .................. 198/773, 774.1, 774.3, 198/778

[56] References Cited

U.S. PATENT DOCUMENTS

| | | | |
|---|---|---|---|
| 2,933,179 | 4/1960 | Hirs | 198/778 X |
| 4,042,104 | 8/1977 | Furlette et al. | 198/774.3 |
| 4,155,443 | 5/1979 | Schuricht | 198/774.3 |
| 4,714,153 | 12/1987 | Bischofberger et al. | 198/774.3 X |
| 4,838,411 | 6/1989 | Rainey et al. | 198/774.3 |
| 4,951,804 | 8/1990 | McCulloch et al. | 198/774.1 X |
| 5,033,609 | 7/1991 | Long | 198/778 X |

Primary Examiner—D. Glenn Dayoan
Attorney, Agent, or Firm—Gifford, Groh, Sprinkle, Patmore and Anderson

[57] ABSTRACT

A lift and carry or walking beam conveyor in which parts are conveyed along a pair of parallel stationary rails by a pair of movable rails located between the stationary rails. The movable rails are moved from a point below to a point above the stationary rails and from a retracted to an advanced or forward position. The conveyor incorporates a curved or quarter-turn portion which is uniquely actuated by pivotal connections to contiguous straight sections.

3 Claims, 7 Drawing Sheets

LIFT AND CARRY ACCUMULATING CONVEYOR

BACKGROUND OF THE INVENTION

1. Field of the Invention

This invention relates to accumulating conveyor systems. More particularly, this invention relates to a lift and carry type of accumulating conveyor having a curved section between contiguous straight sections.

2. Description of the Prior Art

In an accumulating type conveyor, parts are advanced, usually in a single row, in a step by step manner. If it is necessary to direct the parts to a position transverse to a straight run of the conveyor section, the parts are often transfered to another conveyor. This involves the use of discharging and charging mechanisms with the added expense and complexities of the overall system. When there is sufficient floor space available, an arcuate or quarter circle conveyor segment has been successfully used. One such type conveyor using a long radius quarter turn section is disclosed is U.S. Pat. No. 4,838,411, owned by the common assignee of the present invention.

The conveyor of U.S. Pat. No. 4,838,411 utilizes a pair of elongated, spaced apart and parallel stationary rails. A pair of movable rails are located between the stationary rails which move from a point below to a point above the stationary rails, and from a retracted position to an advanced or forward position. Thus parts resting on the stationary rails are picked up by the movable rails and moved forward to a point where they are again lowered to a resting position on the stationary rails. This type of conveyor is particularly adapted for use in conveying conventional parts of various configurations which extend above the rails and also elongate parts which can extend between the rails. For example, automotive connecting rods can be conveyed with or without a cap attached to the beam while the beam extends between the rails, or the cap can be conveyed alone supported entirely above the rails.

When parts are being conveyed around a 90° turn in this conveyor as shown in FIGS. 1, 11 and 11A of the patent, the oscillating motion imparted to the curved section has been isolated from the reciprocating motion of the two adjoining straight section which motions are at 90° to each other. Since the invention of this patent was not directed to the curved conveyor section, per se, the details of the conveyor have not been shown. What has been shown in FIGS. 11 and 11A is that movable rails 34 are split at 86 at both ends of the curved section so that the movable rails in the curved section are separated from the movable rails in the two adjoining sections, and the rails 18 in the curved section pivot between an advanced position shown in FIG. 11A to a retracted position shown in FIG. 11. The only connection of moving parts between a straight section of the conveyor and the curved portion is for the transmission of motor power from the lifter assembly 70 of a straight section to the lift and carry assembly, not shown, for the curved section. With this type of separate actuation of the movable curved rails, the minimum radius turn achievable has been approximately 4'. This has been a minimum radius even with the use of guide rollers 92 and the like as schematically shown in FIGS. 10 and 10A of the patent. The size of the parts being conveyed have not contributed to this required large radius as a connecting rod may be of the order of 8" long with a maximum width of 4" at the crank shaft bearing end and a thickness of approximately 1".

SUMMARY OF THE INVENTION

The present invention provides a lift and carry accumulating conveyor having a curved section joining two straight sections in which the curved section can have a radius as small as 1', and which does not require a separate lift and carry mechanism or the use of an array of guide rollers or the like. The conveyor includes a frame having a pair of elongated, spaced apart and parallel stationary rails including a curved section and first and second contiguous straight section at each end of the curved section. A first pair of elongated spaced apart movable rails extend parallel to the stationary rails in the first straight section, and a second pair of elongated, spaced apart movable rails extend parallel to the stationary rails in the second straight section. Separate lift and carry mechanisms are used to move the movable rails in both the first and second sections between a forward and a retracted position and between an upper and lower position synchronously with each other. A pair of curved spaced apart movable rails extend parallel to the stationary rails in the curved section and are pivotally connected along vertical axes to each of the movable rails in the first and second straight sections. The pivotal connections are constrained to transmit the vertical up and down motion and the horizontal forward and retracting motion of the first and second pair of movable rails to both ends of the curved rails moving them in an arcuate path as if the rails are being pivoted about their centers.

The lifting portion of the lift and carry mechanism utilizes a rotating cam disk with an eccentric channel and a cam follower which is disposed in the channel and connected through a lift rod to an individual straight section being lifted.

In one embodiment, the curved movable rails have cylindrical bearing surfaces which guide the parts being conveyed through the curved section of the conveyor.

In another embodiment of the invention, spaced bridges are attached to the frame so as to span the curved movable and stationary rails. The bridges carry opposite ends of part guide members which urge the parts to follow the desired arcuate path.

BRIEF DESCRIPTION OF THE DRAWING

A more complete understanding of the present invention is presented in the following detailed description which makes reference to the accompanying drawing in which the reference characters refer to like parts throughout the several views, and in which:

FIGS. 8-12 are partial plan and elevational views showing the addition of structure for guiding parts of various configurations in the curved section of the conveyor in which:

DETAILED DESCRIPTION OF A PREFERRED EMBODIMENT OF THE PRESENT INVENTION

Figure 1:
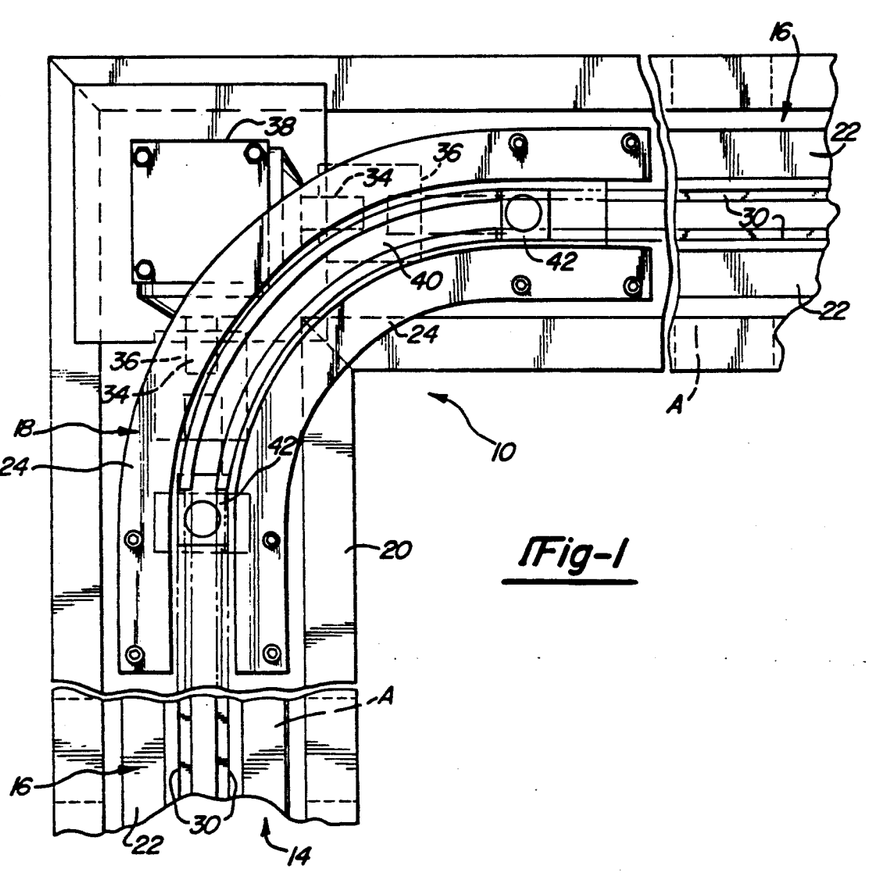
FIG. 1 is plan view of the conveyor of this invention showing a 90° curved portion of the conveyor with the connecting portion of the contiguous straight portions of the conveyor broken away to more clearly show the pivot blocks provided at the ends of curved movable rail members.
Figure 2:
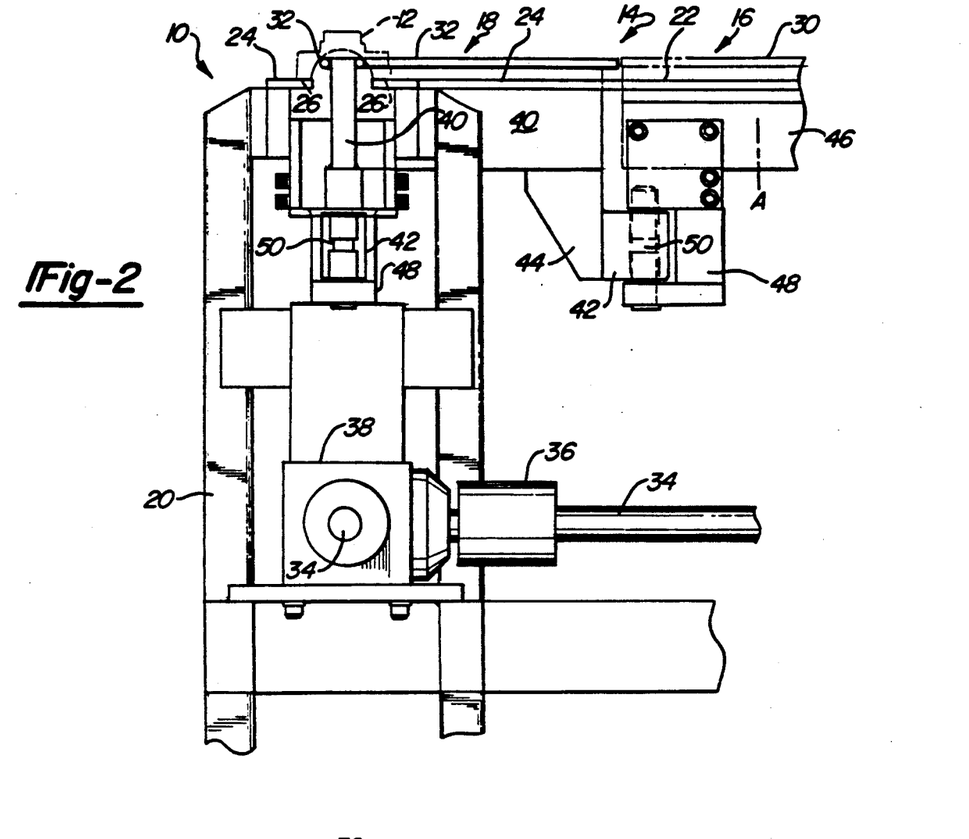
FIG. 2 is an elevational view looking into the curved section from either straight section showing the pivotal connection of the pair of straight movable rails to the curved movable rails.
Figure 3:
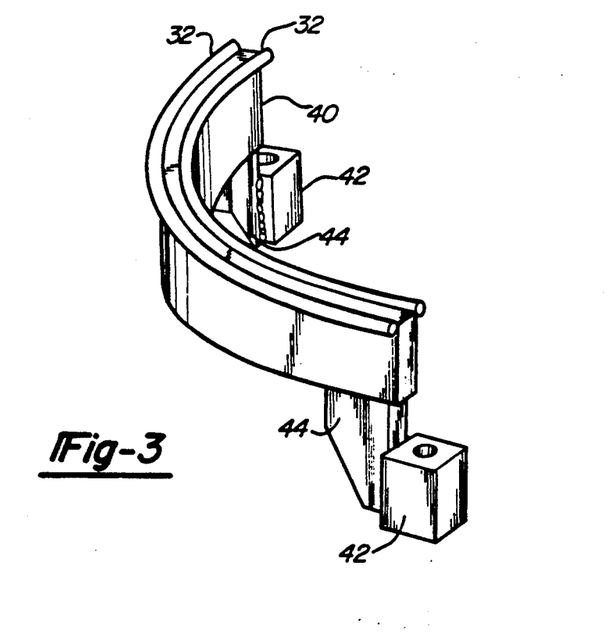
FIG. 3 is a perspective view of the pair of curved spaced apart movable rails with their pivot block located at each end.

Referring to FIGS. 1-3, a preferred embodiment of a conveyor system 10 of the present invention is shown for transporting parts 12 on a conveyor line 14. The conveyor line includes straight sections 16 and a curved section 18. This overall conveyor system is shown in U.S. Pat. No. 4,838,411 which is incorporated herein by reference. The improvement in the present system over that in the patent is directed to the curved section of the conveyor.

Figures 9, 10:
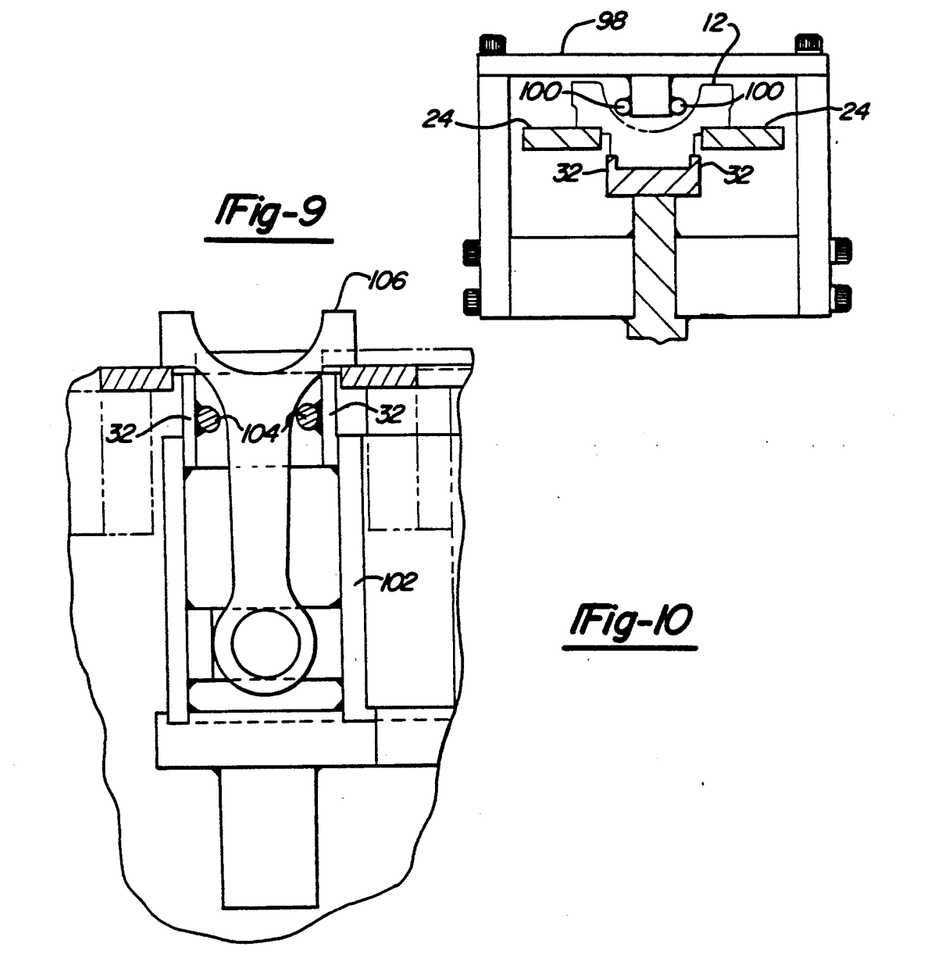
FIG. 9 is a partial elevational view showing the bridge of FIG. 8 supporting curved guide rods which engage the inside of a part being conveyed entirely above the top of the conveyor; the part illustrated is a connecting rod cap being conveyed in an inverted position with its bearing face up.
FIG. 10 is a partial elevational view taken in the curved section of the conveyor showing the addition of curved guide rods affixed to the inner surfaces of the lifting rails.
Figure 12:
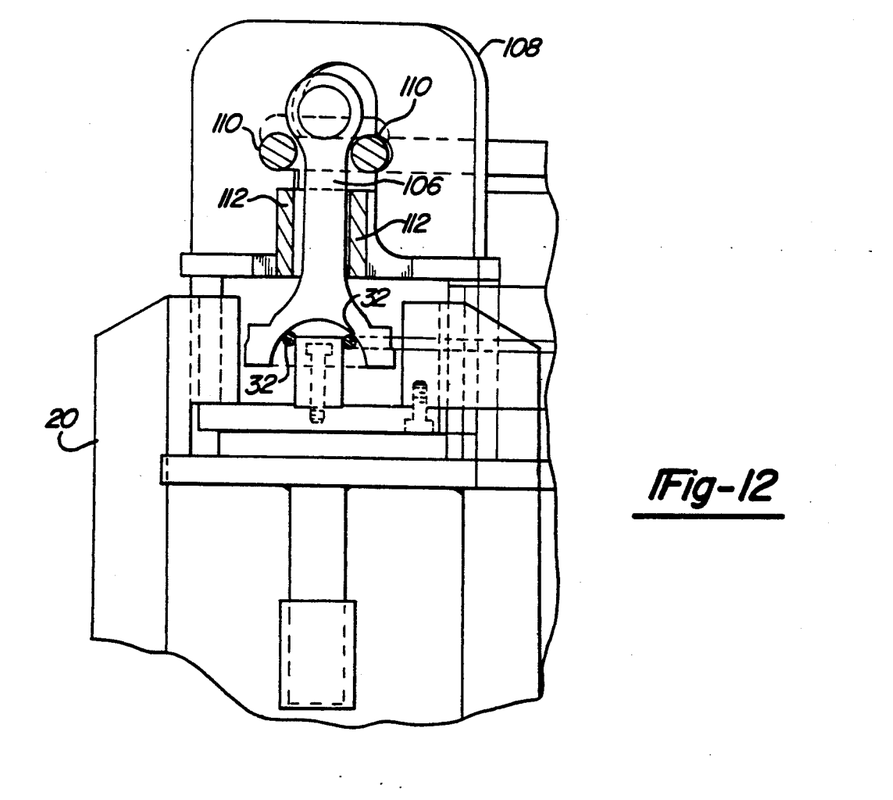
FIG 12 is a partial elevational view showing the bridge of FIG. 11 supporting guide members for conveying a part shown as a connecting rod in a standing position with its pin bore connection upward.

With reference to FIG. 2, the parts 12 being conveyed are piston connecting rod caps for an internal combustion engine. The cap is shown being conveyed with its joint or crank shaft bearing portion downward. In FIG. 9, the cap is being conveyed with its bearing joint upward. In FIGS. 10 and 12 the part being conveyed is a connecting rod. In FIG. 10 the connecting rod is being conveyed with its pin bore down and the beam of the rod extending between the movable rails of the conveyor. In FIG. 12, the connecting rod is being conveyed with its pin bore up and the beam of the rod extending upwardly from the top of the conveyor. It can be seen from these variations that the conveyor system can be used to move parts of various configurations.

Referring to FIGS. 1-3, the conveyor 10 includes a frame 20 to which pairs of straight stationary rails 22 and curved stationary rails 24 are mounted in the straight and curved sections 16 and 18 of the conveyor. As best seen in FIG. 2, both the straight stationary rails 22 and the curved stationary rails 24 are spaced apart from each by a distance so the rails engage and support the surfaces 26 of the cap part 12.

A pair of parallel, spaced apart movable straight rails 30 and movable curved rails 32 are mounted between stationary straight rails 22 and stationary curved rails 24 so they are movable between both an upper and lower position, as well as between a forward and a retracted position relative to the frame.

With reference to FIGS. 1 and 2, power for moving the movable straight rails 24 is supplied from a motor, not shown, through shafts 34 coupled together by universal joints 36 and a right angle gear drive 38. The shafts 34 extend underneath and generally parallel to the straight conveyor sections 16.

The curved movable rails 32 are not independently driven as in U.S. Pat. No. 4,838,411, but rather they are pivotally connected to the movable straight rails 30 and are driven by their synchronous movement. As best seen in FIG. 3, the movable curved rails 32 are connected to a solid base member 40 which has a bearing block 42 connected to it at each end by a mounting plate 44. The movable straight rails 30 are connected to a base member 46. A yolk member 48 is connected to base member 46 and receives the bearing block 42 and pivot shaft 50. Suitable bearings in the bearing block 42 and yolk member 48 allow the base member and the curved movable rails 32 to pivot relative to base member 46 and straight movable rails 30, while the up and down and forward and retracting motions are transmitted between the straight movable rails 30 and the curved movable rails 32. Each end of the curved movable rails is connected to the continguous straight movable rail, and the straight rails are moved synchronously so that the curved movable rails oscillate to convey the part 12 along the stationary curved rails 24. This allows the radius of the quarter circle turn to be drastically reduced from a radius of 4' and above to a radius of 1'. Further separate guide means, such as rollers are unnecessary for the movable curved rails.

The lift and carry or walking beam movement 52 for actuation of the movable rails 30 in each of the straight conveyor sections 16 can be located at the points A contiguous to the curved section 18.

Figure 4:
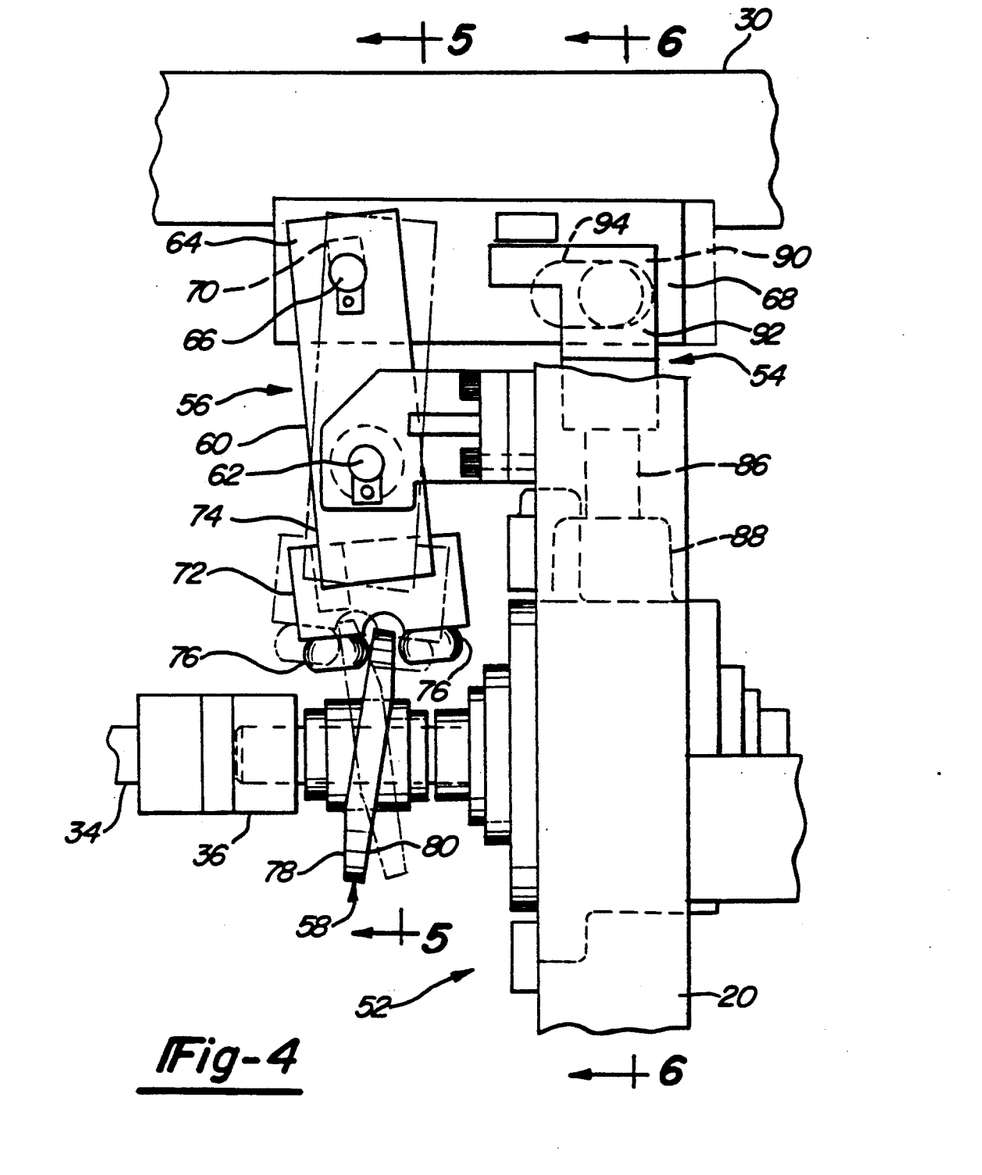
FIG. 4 is a side elevational view of the lift and carry mechanism, one of which is located adjacent to point A in FIGS. 1 and 2 of both straight conveyor sections, and as needed along the length of the conveyor.

Referring to FIG. 4, lift and carry movement 52 includes a lifting mechanism 54 and a reciprocating carry mechanism 56 both operated by rotating shaft 34.

Figure 5:
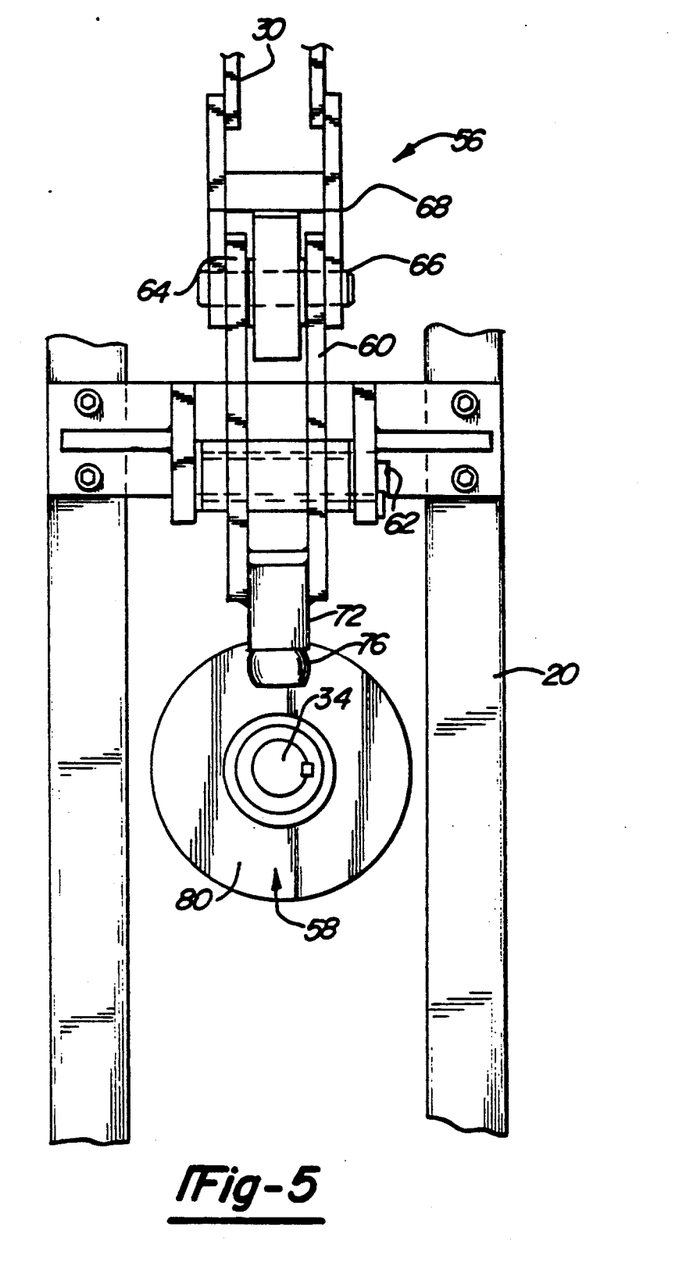
FIG. 5 is an elevational view taken substantially along line 5—5 of FIG. 4 showing a portion of the forward carrying mechanism.

The reciprocating or advancing mechanism 56 as seen in FIGS. 4 and 5 includes a circular disk 58 secured to shaft 34 so that the axis of the disk 58 is oblique with respect to the axis of shaft 34. Thus, upon rotation of shaft 34, the disk 58 "wobbles" between the positions shown in solid line and phantom in FIG. 4.

A vertically extending lever 60 is pivotally secured by a pivot pin 62 to the frame 20 so that the lever 60 pivots about a generally horizontal axis extending transversly with respect to the conveyor line 14.

The upper end 64 of the lever 60 is pivotally connected by a connecting pin 66 to a channel member 68, and this channel member 68 is, in turn, connected to the movable straight rails 30 as best seen in FIG. 5. As best seen in FIG. 4, the connecting pin 66 extends through a vertically extending slot 70 in the channel member 68 to allow limited vertical movement of the channel member 68 with respect to the connecting pin 66.

Referring to FIG. 4, a generally U-shaped yolk 72 is attached to the lower end 74 of the lever 60. This yolk 72 includes two rollers 76 which respectively engage the opposite sides 78 and 80 of the disk 58 adjacent to its outer periphery. Rotation of shaft 34 creates a wobbling movement of the disk 58 between the positions shown in solid line and phantom line. This wobbling movement of the disk 58 pivotally drives the lever 60 about the pivot pin 62 between the position shown in solid and phantom line due to the mechanical coupling of the disk 58 and the yolk 72. Since the upper end 64 of the lever 60 is mechanically coupled to the channel member 68, and thus to the movable rails 30, rotation of the disk 58 reciprocally drives the movable rails 30 between a forward position and a retracted position with respect to the frame 20. One complete longitudinal stroke of the movable rails 30, from a retracted position to a forward position and back to the retracted position, is accomplished for each revolution of the shaft 34.

Figure 6:
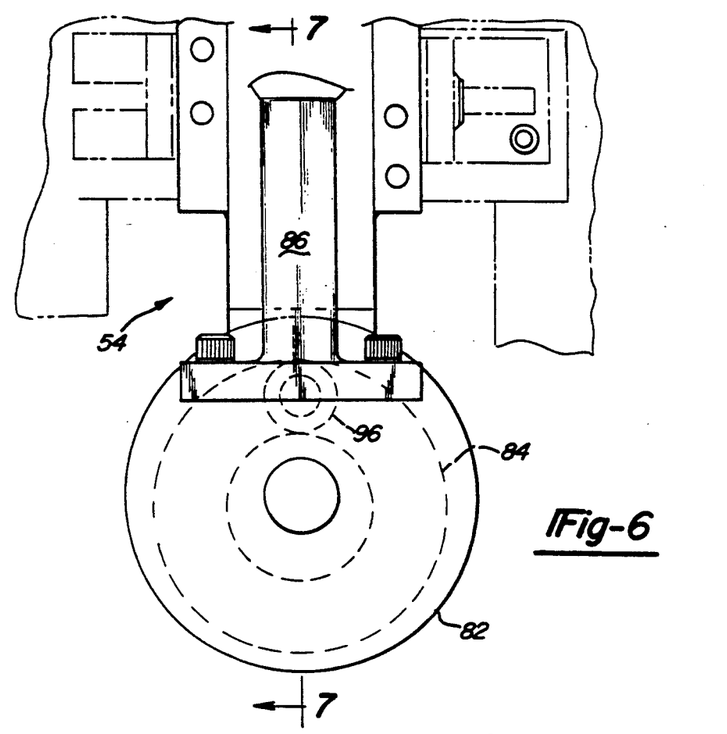
FIG. 6 is an elevational view taken substantially along line 6—6 of FIG. 4 showing a portion of the lift mechanism.
Figure 7:
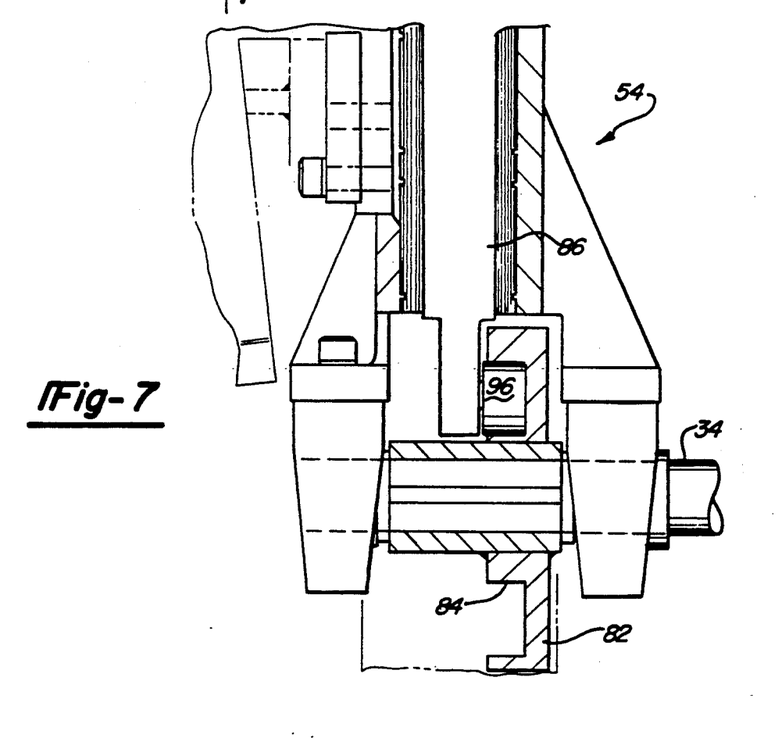
FIG. 7 is an elevational view partially in section taken along line 7—7 of FIG. 6.

Referring to FIGS. 4, 6 and 7, the lifting assembly 54 moves the movable rails 30 between a lower position below stationary rails 22 and an upper position above the stationary rails 22. When the movable rails move above the stationary rails, the parts 12 are lifted from the stationary rails 22 so that they can be transported forward to an advanced position on the conveyor by the action of the reciprocating carry mechanism 56. When the movable rails move below the stationary rails, they deposit the parts on the stationary rails in the advanced position. The movable rails 30 are retracted to their initial position when the rails are in their lower position.

As best seen in FIGS. 6 and 7, a cam disk 82 having an eccentric follower channel 84 is mounted on and rotates with shaft 34.

Referring to FIG. 4, a lifting rod 86 is mounted for vertical movement in bearing 88 attached to frame 20. A cross pin 90 attached to the upper end 92 of the lifting rod 86 is positioned within a longitudinal extending slot 94 in the channel member 68 so that the channel member 68 moves vertically with rod 86 while the channel member can reciprocate from an advanced position to a retracted position as cross pin 90 slides in slot 94.

As best seen in FIG. 7, a cam follower 96 is attached to the lower end of lifting rod 86. The rotating cam follower 96 engages the cam follower channel 84 of cam disk 82, so that upon rotation of shaft 34, the cam disk 82 vertically moves the rod 86 causing the above-mentioned vertical movement of the movable rails above and below the stationary rails.

With vertical movement imparted by the lifting mechanism 54 and a horizontal movement imparted by the reciprocating mechanism 56 of the lift and carry machinery 52, the parts are conveyed along a straight section 16 of the conveyor 10 and around the curve section 18 to another straight section 16. With a typical part such as the uprightly disposed connecting rod cap 12 shown in FIG. 2, the movable rails perform a slight horizontal reorienting function during each lift and carry cycle as the part travels around the curve. This guiding or reorienting is enhanced in the embodiment of FIGS. 1-3 by the constuction of the curved movable rails 32 from round rod material presenting a curved cylindrical bearing surface.

Figure 8:
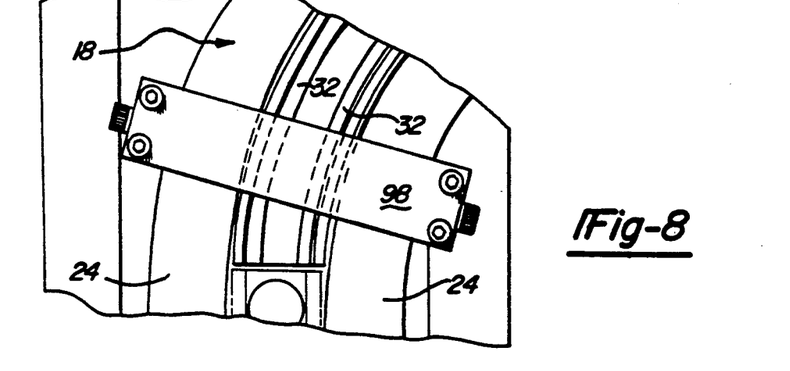
FIG. 8 is a partial plan view showing one of two bridges over the conveyor at one end of the curved section for supporting an additional guide structure.

When this same connecting rod cap which is conveyed in the conveyor shown in the embodiments of FIGS. 1-3 must be conveyed in an inverted, crank shaft bearing side up, position, it is preferable that the movable rails have a flat carrying surface and additional guide surfaces be supplied. This is shown in FIGS. 8 and 9 where a pair of bridges 98, one at each end of the curved section 18, only one of which is shown, span the stationary curved rails 24 and the movable curved rails 32. The bridge carries a pair of cylindrical, rod-like, curved guide members 100 which act against the inner bearing receiving portion of the cap part to guide it around its arcuate path. The bridges can be connected to the movable rail carrying base or to the stationary frame to tailor the guiding action.

In the embodiment of FIG. 10, the part being conveyed is a connecting rod 106 with its pin bore down. In order to allow the connecting rod beam to extend between the movable curved rails 32, the solid base member 40 of FIG. 3 is replaced by a frame work base structure 102, and curved cylindrical, rod-like, guide members 104 are attached to the inner portions of the movable curved rails 32 so that each time the connecting rod 106 is lifted by the movable curved rails 32, the guide members 104 will reorient it in its curved path.

Figure 11:
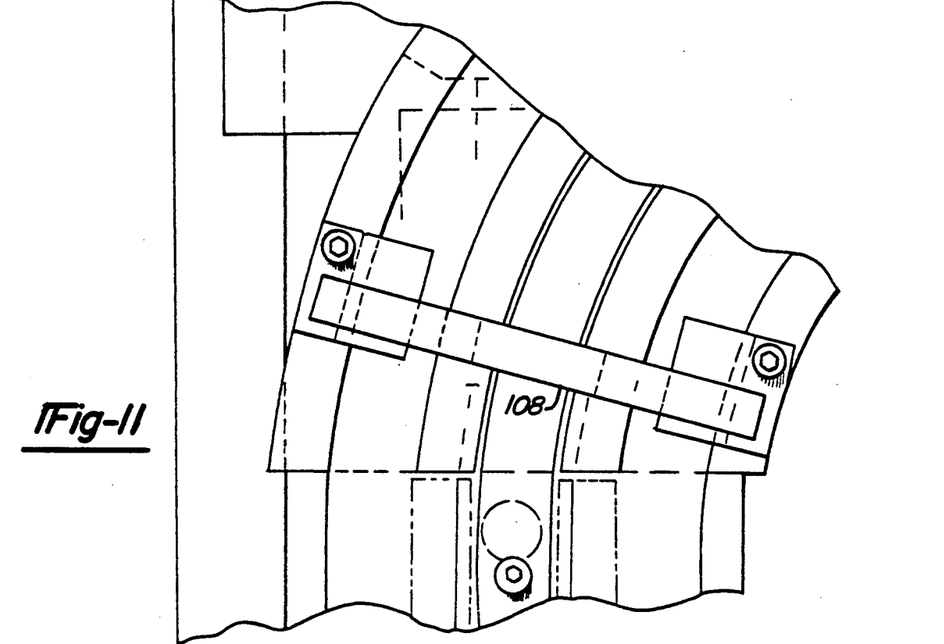
FIG. 11 is a plan view of another embodiment of the invention showing a bridge extending over the curved portion of the conveyor for supporting additional guide elements for conveying a part above the top of the conveyor.

Still another embodiment is illustrated in FIGS. 11 and 12, where it is necessary to convey a connecting rod 106 with its pin bore up. This requires a substantial portion of the rod including its beam and pin bore to be located above the movable curved rails requiring guiding support. Accordingly, the spanning bridges 108 carry not only curved cylindrical, rod-like, guide members 110, but also further guide members 112, guiding the beam of the connecting rod. The bridge 108 can be mounted directly on the support member 20 so that the guide members 110 serve also as the stationary curved rails. Alternatively, the bridge can form a portion of the movable curved rails.

It will be apparent from the few alternative embodiments presented that a variety of curved rail and guide configurations can be used to convey parts of almost any configuration above or partially between the rails around the small radius curved conveyor section of this invention.

The embodiments of the invention in which an exclusive property or privilege is claimed are defined as follows:

1. A conveyor comprising:
   a frame having a pair of elongated, spaced apart and parallel stationary rails including a curved section and first and second contiguous straight sections at each end of said curved section;
   a first pair of elongated, spaced apart movable rails extending parallel to said stationary rails in said first straight section;
   a second pair of elongated, spaced apart movable rails extending parallel to said stationary rails in said second straight section;
   first means for moving said first pair of movable rails between a forward and a retracted position and between an upper and a lower position;
   second means for moving said second pair of movable rails between a forward and a retracted position and between an upper and a lower position in synchronization with the movement of said first pair of movable rails by said first means;
   said first and second means including a rotating cam disk with an eccentric channel and a cam follower disposed within said channel and connected through a lifting rod to one of said first and second pair of movable rails for moving said rails between an upper and lower position;
   a pair of curved spaced apart movable rails extending parallel to said stationary rails in said curved section and having pivotally connected along vertical axes to said first and second pair of movable rails; and wherein said pair of curved movable rails are constrained at said vertical axes to move between said upper and lower position and between said forward and retracted position in synchronization with said first and second pair of movable rails, whereby parts being conveyed along said conveyor are conveyed from the first straight section of said stationary rails to the second straight section of said stationary rails on the curved section of said stationary rails by the movement of said curved movable rails induced by the synchronous movement of said first and second pair of movable rails.

2. The conveyor according to claim 1 wherein said curved movable rails have cylindrical bearing surfaces which guide the parts being conveyed through a curved section of said conveyor.

3. The conveyor according to claim 1 further including a plurality of spaced apart bridges spanning said curved movable rails and said stationary rails in said curved section, said bridges carrying part guide members which urge said parts in a curved path.

* * * * *